Dec. 13, 1966 D. E. T. DAVIS Re. 26,123
STOVE FOR GRILLING VIANDS
Original Filed June 26, 1961
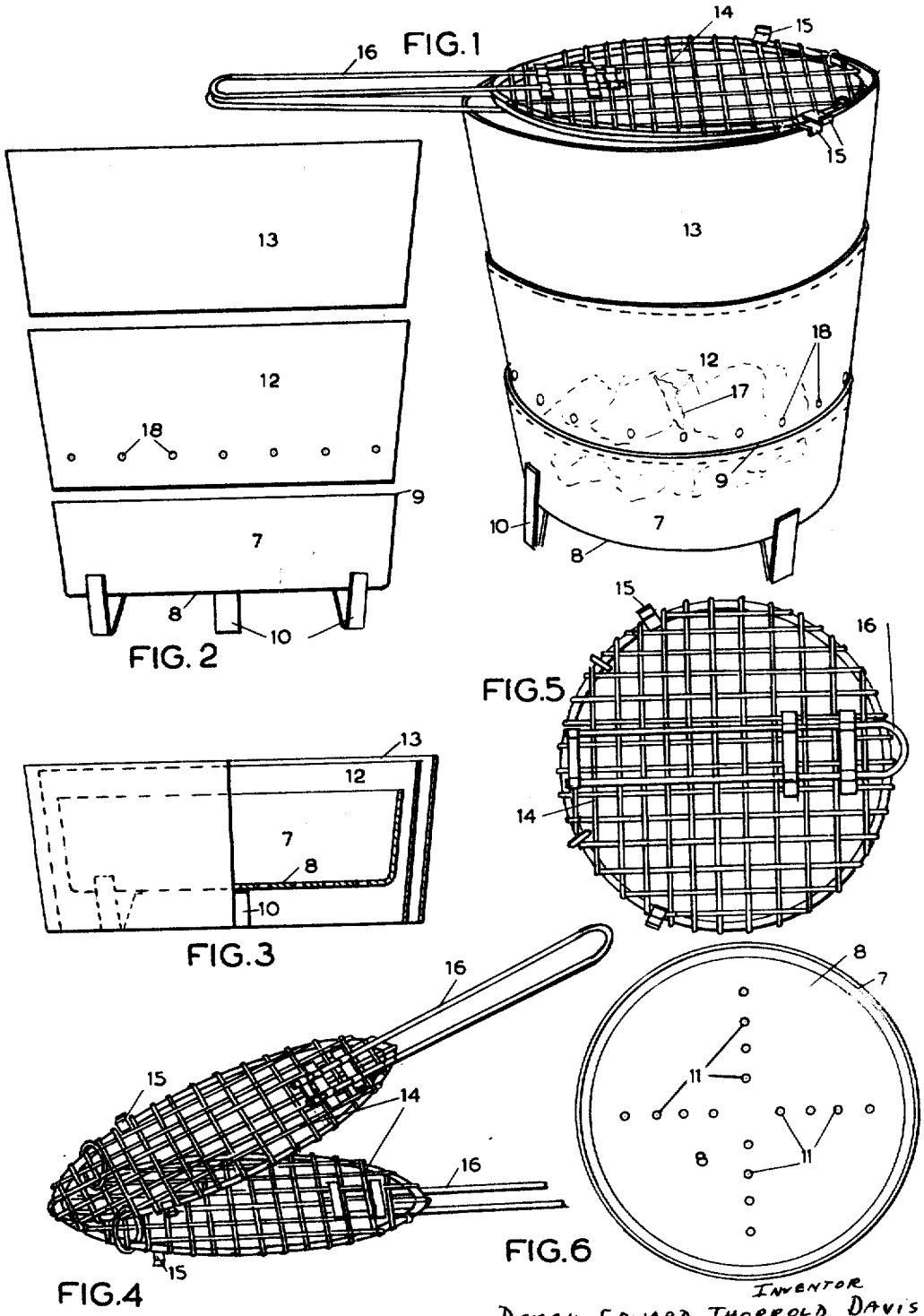
INVENTOR
DEREK EDWARD THORROLD DAVIS
By Shoemaker and Mattare
ATTYS.

United States Patent Office

Re. 26,123
Reissued Dec. 13, 1966

26,123
STOVE FOR GRILLING VIANDS

Derek Edward Thorrold Davis, Culross Road, Bryanston, Johannesburg, Transvaal, Republic of South Africa Original No. 3,046,969, dated July 31, 1962, Ser. No. 119,699, June 26, 1961, which is a continuation of Ser. No. 285,183, May 20, 1963. Application for reissue June 22, 1965, Ser. No. 469,966
3 Claims. (Cl. 126—25)

Matter enclosed in heavy brackets [ ] appears in the original patent but forms no part of this reissue specification; matter printed in italics indicates the additions made by reissue.

*The present application is a continuation of co-pending U.S. patent application Serial No. 285,183, filed May 20, 1963, now abandoned.*

This invention relates to a collapsible transportable stove for cooking meat and the like particularly at picnics and similar outdoor functions.

One object of this invention is to provide an efficient light weight stove which can be easily assembled and readily collapsed for packing and transportation.

Another object is to provide a stove which requires the minimum quantity of easily procurable fuel to effect a grilling operation.

A further object is to provide a stove which when used in the country will burn fuel which will neither spill to spread a flame or leave smouldering embers to start a fire.

A still further object is to limit the number, size and portion of the ventilation holes in the stove so as to make the induced air enter which sufficient velocity to form a blast to intensify the combustion of a very limited quantity of fuel used for the cooking.

In accordance with this invention there is provided a stove built of fitted sheet metal cylindrical sections assembled to form a ventilated bucket-like shape having feet and a metal mesh cover and said sections adapted to be disassembled and nested concentrically for transport.

The invention further provides for a cap in the form of two layers of a metal wire mesh hinged together and having handles extensible with a sliding action and for lugs extending from said cap to support it on the top of the stove.

The invention also provides for a limited number of small ventilation holes to be placed in the bottom and in the wall of the bucket.

By way of example a preferred form of stove according to this invention suitable for use at a small picnic will be described.

In the drawings:

FIG. 1 shows the stove assembled for use,

FIG. 2 is an exploded view of the parts of the stove,

FIG. 3 is an assembly of the parts for transport,

FIG. 4 is a cover open to receive the viands to be grilled,

FIG. 5 the cover as shown in FIG. 4 folded for transport, and

FIG. 6 a plan of the bottom of the stove showing a convenient distribution of the ventilation holes.

In the example illustrated the stove is made of mild steel sheet about 26 to 24 B.G. thick and its approximate sizes are as follows:

The bottom or bucket section 7 is spun to form a flat bottom dish 3¼" high, 9" diameter at bottom 8 and 9¾" diameter at top 9. The bottom 8 has feet 10 welded on to lift it to 1" to 2".

The bottom 8 has 16 3/16" holes distributed over the area conveniently on four radii.

The stove is in three sections each having the shape of an inverted truncated cone. The bottom one 7 is adapted to have the smaller 12 of the cones fitting into it a small way, and the larger one 13 of the truncated cone fits a small way into the top of the smaller cone 12, as shown in FIG. 1. These two conical sections 12 and 13 have the following approximate dimensions respectively: both are 5" high and 12 is 9⅝" at the bottom and 10¾" diameter at the top. 13 is 10⅝" diameter at the bottom and 11" at the top. When fitted together in the way described, the stove has an overall height of approximately 13".

Two flat pieces 14 of metal wire mesh, FIGS. 4 and 5 about 10" in diameter are hinged together and provided with metal projecting lugs 15, this forms a loose fitting cap or cover for the top of the stove. Each piece 14 has a long U-shaped wire 16 adapted to be slid radially outwardly to form a handle (FIG. 4). The viands to be grilled are conventionally placed between the two parts 14 of the cover and when the stove is burning they are turned over from time to time for the viands to become properly grilled. Care must be taken not to over crowd the top but to leave room for the heated air to escape readily from the top of the stove.

In use this stove has been constructed to function when crumped newspaper only is used as the initial fuel.

Three or four sheets of newspaper are lightly balled up, dropped onto the bottom of the stove as shown in dotted lines 17, FIG. 1 and ignited. This is the initial fuel; normally the fat dropping from the meat, which almost immediately begins to fall, augments the newspaper fuel 17 and the heat provided by the fat carried and burning on the ashes of the paper is sufficient to complete the grill.

It will be noted that the holes 11 in the bottom 8 are well spread and are only 3/16" in diameter. Usually there are only 16 of them so that they provide a total area of .4416 square inch. Around the lower portion of the second cone 12 are some 20 holes 18, these also are 3/16 inch in diameter which give a total area of .552 square inch. This means that a total area of all these 3/16" holes is just under a square inch, and through this small area the air must pass to a fire at the bottom of a chimney 13" high. The area of the chimney has an average of not less than 78.54 square inches. It is accordingly apparent from the above figures that the average interior cross-sectional area of the body means has a ratio to the total area of all of said holes generally on the order of eighty to one. It might be thought that combustion would be damaged due to restriction of air. However, the air is free to come in at points over a wide area; it has not to penetrate a thick bed of fuel. The newspaper, as a fuel, is not the same as would be a thick bed of charcoal or coal. The air, therefore, in practice, enters as jets and blows up the flames. The natural fat from the viands, or from that acquired in their preparation, is melted and falls in droplets widely distributed and relatively slowly over the burning paper or on the ashes of the paper. This fat burns somewhat fiercely in the jets of air which flow in from the bottom. The few ventilation holes 18 serve to allow jets of air to enter and these serve to complete the combustion and reduce the tendency for smoke to be formed.

From the description of this stove it will be realized that this invention provides a stove for grilling fired by only, say three sheets of newspaper. At the end of the cooking there are no coals to throw out or smouldering embers to dampen. A little ash from burnt paper is all that is left. No grass or forest fires are likely to be started by accidental ignition emanating from the cooking operation where this stove is used.

When the stove is to be packed for transport, the two cylindrical sections 12, 13, when separated, are nested one within the other, and the bottom section 7 lowered into them. The cap 14 as shown in FIG. 5 can be placed on top of the disassembled parts of the stove for packing purposes.

*It is apparent from the foregoing that the basic concept of the invention lies in the provision of a portable grilling unit for grilling fatty viands and the like, wherein the only fuel required is paper such as newspaper which is employed as an initial fuel to produce initial flames which causes the fats or oils to the viands and the like to melt and drop on the burning paper or ashes thereof whereupon these fats or oils serve as a supplementary fuel and burn to complete the cooking operation. Opening means of suitable size and arrangement is provided in the unit to permit induced air to enter the unit in such a manner as to support initial combustion of the paper and to continue combustion of the limited quantity of fats or oils to complete the cooking operation.*

What I claim as new and desire to secure by Letters Patent is:

1. A portable grilling unit comprising a body means formed of relatively thin sheet-like fireproof material and being of tubular construction, said body means being open at the top end thereof and closed at the bottom end thereof, said body means including a base portion having leg means connected thereto and extending downwardly therefrom for supporting the base portion in spaced relation to a supporting surface, the closed lower end of said body means having a plurality of spaced holes formed therethrough, said body means having a plurality of circumferentially spaced holes formed therethrough only in the lower third of the body means so that air may pass through said circumferentially spaced holes, said body means having a height greater than the maximum cross-sectional dimension of the body means, the average interior cross-sectional area of said body means having a ratio to the total area of all of said holes generally on the order of eighty to one, and means for supporting fatty viands at the open upper end of the body means, said base portion being adapted to receive and support therein paper as an initial fuel, the paper being of limited quantity so as not to block the passage of air through the circumferentially spaced holes, the fuel being disposed inwardly of the circumferentially spaced holes and fats from fatty viands supported at the open upper end of the body means dripping down on the paper and serving as a supplemental fuel.

2. A portable grilling unit comprising a body means formed of at least two nestable body sections each formed of relatively thin sheet-like fireproof material and being of tubular construction, one of said body sections comprising a base member and being open at the top end thereof and defining a top edge and being closed at the lower end thereof, leg means connected with the base member and extending downwardly therefrom for supporting the base member in a spaced relation to a supporting surface, the closed lower end of said base member having a plurality of spaced holes formed therethrough, another of said body sections being open at the upper and lower ends thereof, said other body section having a plurality of circumferentially spaced holes formed therethrough adjacent the lower end thereof, the open top end of said base member tapering downwardly at the lower open end of said other body section also tapering downwardly with the lowermost peripheral portion of said other body section being of less dimension than the uppermost peripheral portion of said base member such that when said other body section is in assembled position, the lowermost portion thereof is nested within the uppermost portion of said base member with the lower outer peripheral wall of said other body section in contact with the inner upper peripheral wall of said base member so as to retain the body sections in operative nested relationship with the holes in said other body section being spaced above and closely adjacent the upper edge of said base member with the circumferentially spaced holes located only in the lower third of the over-all body means so that air may pass through said circumferentially spaced holes, said body means when in assembled relationship having a height greater than the maximum cross-sectional dimension of said body sections, the average interior cross-sectional area of the body mean having a ratio to the total area of all of said holes generally on the order of eighty to one, and means for supporting fatty viands at the open upper end of the body means, said base member being adapted to receive and support therein only paper as an initial fuel, the paper being of limited quantity so as not to block the passage of air through said circumferentially spaced holes, the fuel being disposed inwardly of said circumferentially spaced holes, and fats from fatty viands supported at said open upper end portion of the body means dripping down on the paper and serving as a supplemental fuel.

*3. A portable grilling unit comprising a body means and a wire grill, said body means including a side wall portion and a bottom wall portion, each of said wall portions being formed of thin sheet-like fireproof material, said side wall portion including a plurality of tapering wall sections which are movable with respect to one another, means interconnecting said wall sections for retaining them in upwardly flaring operative erected relationship to define a continuously upwardly flaring body means, said side wall portion defining a space therewithin for receiving paper as an initial fuel which is adapted to be supported on said bottom wall portion, said side wall portion defining an open unobstructed upper end, said side wall portion having openings therethrough concentrated adjacent said bottom wall portion constituting the sole combustion draft openings through said side wall portion, said wire grill being detachably supported on the upper edge of said body means, said wire grill including two like wire mesh sections hinged together, each of a dimension to substantially cover said unobstructed upper end and each having a handle diametrically opposite the hinge to provide a viand clamp and said body means being unobstructed from said upper end thereof to said bottom wall portion to allow fats or oils of the viands to be directed downwardly and fall upon the burning paper and function as supplemental fuel.*

References Cited by the Examiner

The following references, cited by the Examiner, are of record in the patented file of this patent or the original patent.

UNITED STATES PATENTS

| | | | |
|---|---|---|---|
| 37,926 | 3/1863 | Smith | 126—9 |
| 463,495 | 11/1891 | Dermigny. | |
| 943,569 | 12/1909 | Scamardi | 126—9 X |
| 1,391,415 | 9/1921 | Schonitzer | 126—9 |
| 1,725,521 | 8/1929 | Keiner | 126—25 |
| 2,094,915 | 10/1937 | Dawson | 126—25 |
| 2,114,698 | 4/1938 | Babin | 99—446 |
| 2,120,683 | 6/1938 | Simmons | 126—25 |
| 2,488,014 | 11/1949 | Higman | 126—25 X |
| 2,530,166 | 11/1950 | Johannsen | 126—25 |
| 2,545,005 | 3/1951 | Russell | 99—394 |
| 2,607,334 | 8/1952 | Perlman | 126—9 |
| 2,729,313 | 1/1956 | Ernestus | 52—246 |
| 2,787,995 | 4/1957 | Alter | 129—9 |
| 2,860,624 | 11/1958 | Eddy. | |

FOREIGN PATENTS

| | | |
|---|---|---|
| 307,994 | 10/1916 | Germany. |

FREDERICK KETTERER, *Primary Examiner.*